United States Patent [19]
Adachi

[11] Patent Number: 5,273,599
[45] Date of Patent: Dec. 28, 1993

[54] BEAD LOCK METHOD

[75] Inventor: Koji Adachi, Kodaira, Japan

[73] Assignee: Bridgestone Corporation, Tokyo, Japan

[21] Appl. No.: 884,159

[22] Filed: May 18, 1992

[30] Foreign Application Priority Data

May 29, 1991 [JP] Japan ............................... 3-152221

[51] Int. Cl.⁵ ............................................ B29D 30/32
[52] U.S. Cl. .................................. 156/131; 156/135; 156/403
[58] Field of Search ........ 156/131, 132, 135, 398–403, 156/414, 415, 417, 421.8

[56] References Cited

U.S. PATENT DOCUMENTS 3,698,987 10/1972 Woodhall et al. .
3,816,218 6/1974 Felten .
3,950,212 4/1976 Bullmann ............................. 156/398

FOREIGN PATENT DOCUMENTS 0020283 10/1980 European Pat. Off. .
71840 2/1983 European Pat. Off. ............. 156/403
0468718 1/1992 European Pat. Off. .

Primary Examiner—Knable Geoffrey L.
Attorney, Agent, or Firm—Sughrue, Mion, Zinn, Macpeak & Seas

[57] ABSTRACT

A bead lock apparatus incorporating in a tire building apparatus and a method of locking a bead ring by using the bead lock apparatus for transferring a bead ring from a bead setter engaging the inner circumferential surface of the bead ring to the tire building apparatus at a predetermined position thereon. The bead lock apparatus includes a plurality of first bead lock segments positioned corresponding to pawl members forming the bead setter and circumferentially spaced from each other with predetermined distances, and a plurality of second bead lock segments positioned between the first bead lock segments in the same plane and circumferentially spaced from each other with predetermined distances. The bead lock apparatus further includes driving devices for displacing the first and second bead lock segments, respectively, to expand and contract independently from each other.

2 Claims, 3 Drawing Sheets

BEAD LOCK METHOD

BACKGROUND OF THE INVENTION

This invention relates to a bead lock apparatus incorporating in a tire building apparatus and a bead lock method for locking a bead ring by using the bead lock apparatus, and more particularly to a method for properly holding a bead ring without causing its deformation or eccentricity in fixing the bead ring to a tire forming drum at a predetermined position thereon.

So-called positive or negative type bead lock apparatuses have been known which incorporate in a tire building apparatus receiving bead rings from the bead lock apparatuses onto a forming drum at predetermined positions thereon.

In the positive type bead lock apparatus, a cylindrical band is expanded only at its center portion of its length, and a bead ring held by a bead setter is then delivered from the setter onto the cylindrical band at the boundary position between the expanded portion and the remaining portion of the band.

In the negative type bead lock apparatus, on the other hand, a bead ring held by a bead setter is positioned around the outer circumferential surface of a band held with a uniform diameter on a forming drum, and the bead ring is then delivered onto a plurality of bead lock segments expansible and contractible at predetermined positions.

With the positive type bead lock apparatus, a bead ring is held by the bead setter composed of a plurality of expansible and contractible pawl members circumferentially spaced predetermined distances from each other and engaging the inner circumferential surface of the bead ring. Therefore, this type lock apparatus has an advantage in that the bead ring can be sufficiently properly held without causing any deformation or the like.

However, when the bead ring is delivered onto the band at the boundary position between the expanded portion and the remaining portion of the band on a tire building apparatus, the bead ring is likely to move to be eccentric to the axis of a forming drum due to wrinkles occurring at the boundary position of the band. Moreover, reinforcing cords in the band become nonuniform in circumferential directions due to the wrinkles, and an extra process step is needed for expanding the band at the center portion of the length to complicate the production processes.

With the negative type bead lock apparatus, on the other hand, as a bead ring is delivered onto a band held in a cylindrical form having a uniform diameter, it is possible to eliminate the disadvantages due to the expansion of its center portion described above.

In the negative type bead lock apparatus, however, the bead lock segments are brought into engagement with the inner circumferential surface of the bead ring by expanding the bead lock segments to increase their diameter. Therefore, the bead ring cannot be held by the bead lock segments under the state that the bead ring is held by the bead setter in engagement with the inner circumferential surface of the bead ring. Consequently, deformation or eccentricity of the bead ring cannot be avoided when the bead lock segments are brought into engagement with the bead ring.

SUMMARY OF THE INVENTION

It is an object of the invention to provide a bead lock apparatus and a bead lock method which eliminate all the disadvantages of the prior art and are able to deliver a bead ring from a bead setter onto a tire building apparatus, keeping the advantages of the prior art.

In order to accomplish the object of the invention, in a bead lock apparatus for transferring a bead ring from an expansible and contractible bead setter engaging the inner circumferential surface of the bead ring to a tire building apparatus at a predetermined position thereon, the bead lock apparatus according to the invention comprises a plurality of first bead lock segments positioned corresponding to pawl members forming the bead setter and circumferentially spaced from each other with predetermined distances, a plurality of second bead lock segments positioned between the first bead lock segments in the same plane and circumferentially spaced from each other with predetermined distances, and driving means for displacing the first and second bead lock segments, respectively, to expand and contract independently from each other.

Moreover, the bead lock method for transferring a bead ring from a bead setter to a tire building apparatus according to the invention comprises steps of positioning the bead ring held by a bead setter engaging the inner circumferential surface of the bead ring onto a position around a band by means of the bead setter, simultaneously expanding with substantially equal distances second bead lock segments which are not corresponding to pawl members circumferentially spaced with predetermined distances to form said bead setter, to bring the second bead lock segments into engagement with the inner circumferential surface of the bead ring with substantially equal forces through a band, removing the bead setter from the bead ring, and expanding first bead lock segments simultaneously with substantially equal distances to bring the first bead lock segments into engagement with the inner circumferential surface of the bead ring with substantially equal forces through a band.

With the bead lock apparatus according to the invention, a bead setter is brought into engagement with a bead ring on its inner circumferential surface at plural positions circumferentially spaced with predetermined intervals so that the bead ring can be properly held concentrically or co-axially to the bead setter itself without causing any undue deformation or eccentricity of the bead ring. Moreover, the bead ring can be arranged at a position around the outer circumference of a band on a forming drum under the properly held condition so that the bead ring is exactly concentric or coaxial to the axis of the forming drum.

After the bead ring has been set at the predetermined position in the desired manner, the forming drum is rotated such that the second bead lock segments are positioned between the pawl members forming the bead setter, and under this condition only the second bead lock segments are expanded simultaneously with substantially the same distances by means of the driving means associated therewith. As a result, the second bead lock segments are brought into engagement with the inner circumferential surface of the bead ring through the band. Consequently, the bead ring can be also held concentrically or coaxially to the axis of the forming drum by means of the second bead lock segments without causing any interference between the bead setter and the second bead lock segments.

Thereafter, the bead setter is contracted and retracted so that the supporting of the bead ring is completely transferred from the bead setter to the second bead lock segments. The first bead lock segments are then expanded by the other driving means associated therewith to bring the first lock segments into engagement with the inner circumferential surface of the bead ring. Accordingly, the bead ring is maintained with the high concentricity to the axis of the forming drum, while the roundness of the bead ring can be sufficiently improved.

With the bead lock apparatus according to the invention, the bead ring can be transferred from the bead setter engaging the inner circumferential surface of the bead ring onto the forming drum, while the band is maintained with its uniform diameter throughout its length in this manner. Therefore, any deformation, eccentricity or the like of the bead ring can be sufficiently prevented and at the same time reinforcing cords in the band can be maintained uniform in its circumferential direction. Moreover, the process step for expanding the center portion of the band in its length can be dispensed with.

The invention will be more fully understood by referring to the following detailed specification and claims taken in connection with the appended drawings.

DESCRIPTION OF THE PREFERRED EMBODIMENTS

Figure 1:
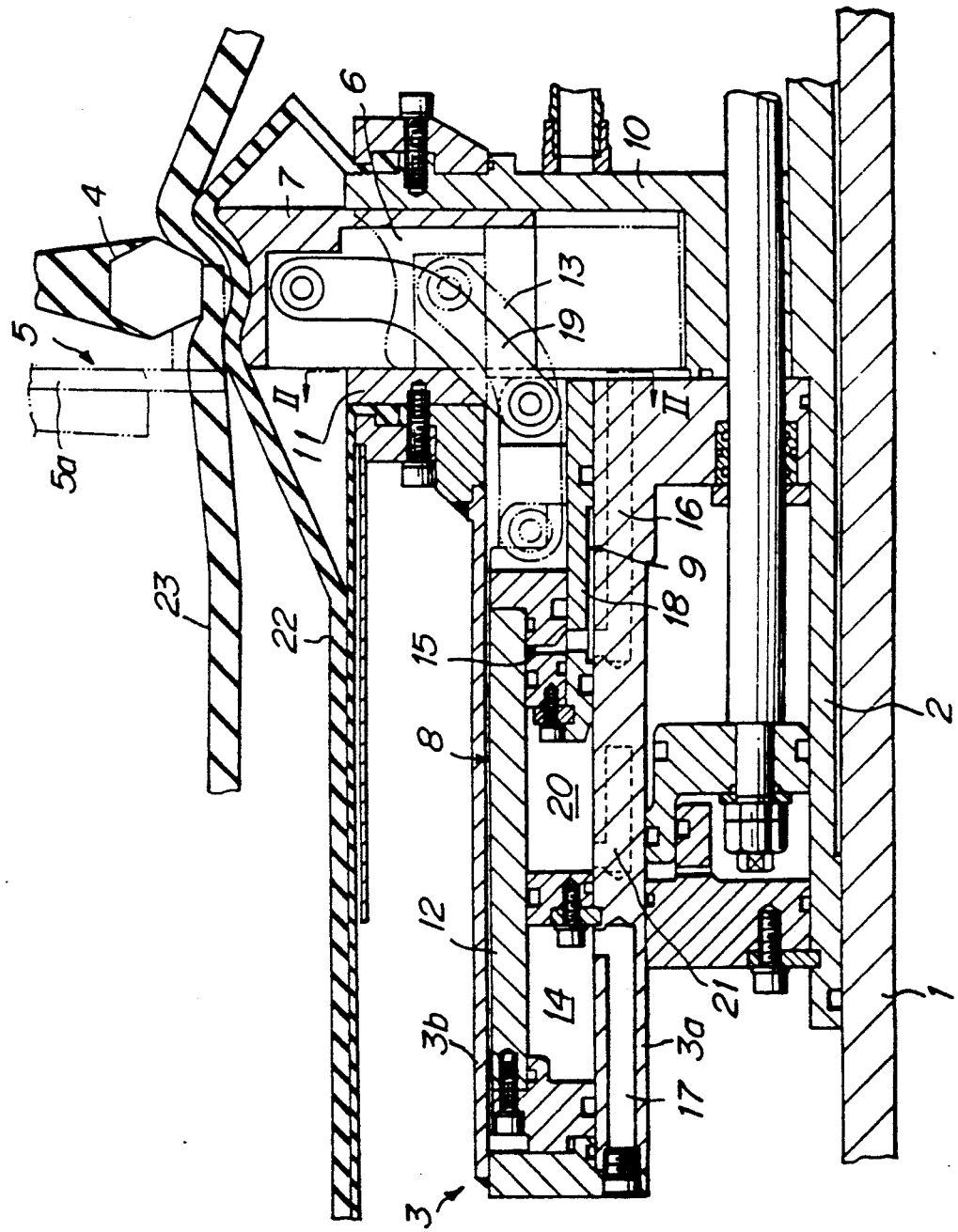
FIG. 1 is a fragmentary sectional view illustrating by way of example the bead lock apparatus according to the invention.

FIG. 1 is a fragmental sectional view illustrating by way of example the bead lock apparatus according to the invention. The bead lock apparatus shown in FIG. 1 is applicable to a tire building apparatus for carrying out all the processes, for example, from fitting of a band to shaping of a green case on one forming drum. In general, a tire has two bead rings on both sides. In practice, therefore, two bead lock apparatuses incorporate in one tire building apparatus. One bead lock apparatus on one side will be explained hereinafter.

Such a tire building apparatus includes a forming drum having a shaft, for example, a hollow shaft 1 and two sleeves 2 axially spaced from each other and fitted on the hollow shaft 1. The tire building apparatus further includes reciprocating driving means (not shown) for causing these two sleeves 2 to move toward and away from and in synchronism with each other.

In FIG. 1 illustrating only one bead lock apparatus, a cylinder 3 is axially slidably fitted on one of the sleeves 2, and a plurality of hard core flanges are pivotally connected to the axially inner end of the cylinder 3 by means of a link mechanism (not shown). Driving links are provided, whose ends are pivotally connected to the hard core flanges and the other ends are pivotally connected to the sleeve 2 for expanding and contracting the hard core flanges.

A bead setter 5 is composed of pawl members 5a adapted to engage and support a bead ring 4 with its inner circumferential surface at plural positions circumferentially spaced from each other with predetermined intervals.

The bead lock apparatus comprises a plurality (for example, six) of first bead lock segments 6 radially movable and arranged radially inward of and corresponding to the pawl members 5a of the bead setter 5 and circumferentially spaced from each other with predetermined intervals and a plurality (for example, also six) of second bead lock segments 7 radially movable and arranged between the first bead lock segments 6 so as not to correspond to the pawl members 5a of the bead setter 5 and circumferentially spaced from each other with predetermined intervals. Moreover, driving means 8 and 9 are provided for expanding and contracting the first and second bead lock segments 6 and 7 independently from each other.

Guide plates 10 and 11 are provided spaced in the axial direction of the cylinder 3 from each other. When the first and second bead lock segments 7 and 8 are expanded and contracted, they are guided by bringing the guide plates into contact with surfaces of the first and second bead lock segments 6 and 7, respectively.

The driving means 8 for the first bead lock segments 6 comprises a piston 12 of the cylinder 3 having inner and outer cylindrical members 3a and 3b and slidably contacting the inner cylindrical member 3a, and curved or bent links (curved links in the shown embodiment) 13 each having one end pivotally connected to the axially inner or forward end of the piston 12 and the other end pivotally connected to the intermediate portion of one of the first bead lock segments 6.

In the state shown in FIG. 1, the piston 12 of the cylinder 3 is in its retracted position and the fluid chamber 14 provided on the rearward side of the piston 12 is in its opened condition. Under this condition, when a pressurized fluid, for example, pressurized air is supplied through the fluid passage 16 provided in the inner cylindrical member 3a into the fluid chamber 15 provided on the forward side of the piston 12, the piston is caused to move forwardly, with the result that the first bead lock segments 6 connected through the curved links 13 to the piston 12 are moved radially outwardly and simultaneously with equal distances with the aid of the action of the curved links 13. The expansion of the first bead lock segments 6 is effected in this manner.

On the other hand, with the fluid chamber 15 being opened, the pressurized air is supplied through the fluid passage 17 provided in the inner cylindrical member 3a into the fluid chamber 14 so that the piston 12 is caused to move rearward into the position shown in FIG. 1 and hence the first bead lock segments 6 are moved radially inwardly and simultaneously with equal distances. The contraction of the first bead lock segments 6 is effected in this manner.

The driving means 9 for the second bead lock segments 7 comprises a piston 18 having a diameter smaller than that of the piston 12 and slidably contacting the inner cylindrical member 3a and positioned on the forward end of the piston 12, and curved links 19 each having one end pivotally connected to the forward end of the piston 18 and the other end pivotally connected to the intermediate portion of one of the second bead lock segments 7.

When the pressurized air is supplied or exhausted through the fluid passage 21 into or from the fluid chamber 20 on the rearward side of the piston 18 and the pressurized air is exhausted or supplied from or into the fluid chamber 15 which is also for the piston 12, the driving means 9 is actuated by the pressure difference between the fluid chambers 15 and 20. The second bead lock segments 7 are expanded or contracted in substantially the same manner as in the first bead lock segments 6.

In the above arrangement, the rear fluid chamber 14 is formed between the piston 12 and a stationary barrier provided between the pistons 12 and 18, and the intermediate fluid chamber 20 is formed between the stationary barrier and the second piston 18. The front fluid chamber 15 is formed between the piston 18 and the forward end of the piston 12.

Figure 2:
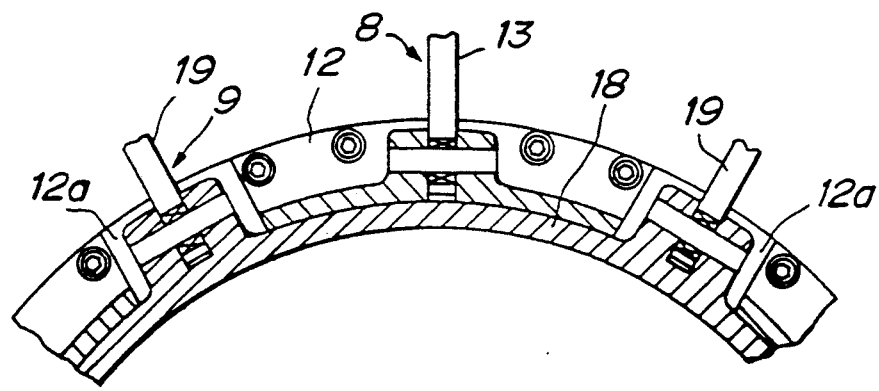
FIG. 2 is a sectional view taken along the line II—II in FIG. 1.

With the driving means 8 and 9 constructed as described above, the piston 12 located outwardly of the piston 18 is formed with recesses 12a in order to avoid any interference with the pivoted portions of the links 19 provided on the inwardly positioned piston 18 as shown in FIG. 2. Therefore, the pivoted portions of the links 13 and 19 to the pistons 12 and 18 can be arranged on the same circumference without any interference with the pistons 12 and 18. Reference numeral 22 in FIG. 1 denotes a bladder which serves to fold an edge of a band 23.

The operation of the bead lock apparatus constructed described above will be explained by referring to FIGS. 3a to 3i hereinafter. Like components are designated by the same reference numerals as those in FIGS. 1 and 2. The half of the tire building apparatus on the left side is shown in FIGS. 3a to 3i and the operation on the left side will be explained.

Figure 3A:
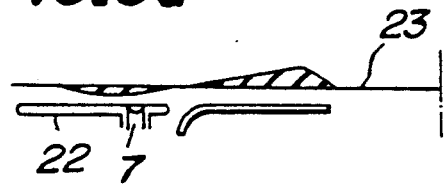
FIGS. 3a, 3b, 3c, 3d and 3e are schematic views illustrating steps for transferring a bead ring from a bead setter to a tire building apparatus according to the method of invention, respectively.
Figure 3B:
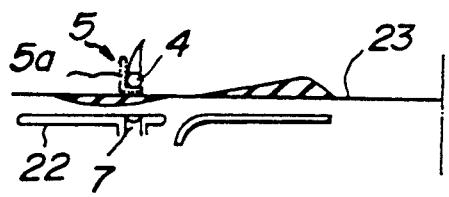

A band 23 previously formed in a cylindrical shape is arranged on the outer circumference of a tire building apparatus including the bead lock apparatuses as shown in FIG. 3a (only one bead lock apparatus is illustrated). Thereafter, a bead ring 4 held by a bead setter 5 engaging the inner circumferential surface of the bead ring 4 is arranged around the outer circumference of the band 23 at the predetermined position in the axial direction as shown in FIG. 3b.

In this case, the bead ring 4 is held by the bead setter 5 whose plurality of pawl members 5a circumferentially spaced with predetermined intervals engage the inner circumferential surface of the bead ring 4. Therefore, any deformation of the bead ring 4 is sufficiently prevented by the pawl members 5a irrespective of the any weight of the bead ring 4. Moreover, the bead ring 4 is held by and exactly concentric or coaxial to the bead setter 5 itself with the aid of the pawl members 5a expansible and contractible in synchronism with each other.

Consequently, when the bead ring 4 held by the bead setter 5 is arranged and positioned around the outer circumference of the band 23 as described above, the bead ring 4 is exactly concentrically or coaxially arranged to the tire building apparatus.

Figure 3C:
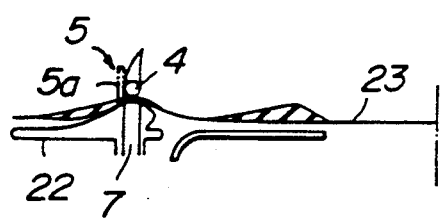

Thereafter, by actuating the driving means 9 under the condition of the tire building apparatus rotated previously or at this time, the second bead lock segments 7 not positioned corresponding to the pawl members 5a of the bead setter 5 are moved simultaneously with the same distances to expand their diameter. As a result, the bead lock segments 7 are brought into engagement with the inner circumferential surface of the bead ring 4 with substantially equal forces through the band 23 as shown in FIG. 3c.

Consequently, the bead ring 4 is held sufficiently concentrically or coaxially to the tire building apparatus by the second bead lock segments 7, and any deformation of the bead ring 4 is effectively prevented.

It is not required to hold the bead ring 4 by the bead setter 5 after the six bead lock segments 7 have engaged the inner circumferential surface of the bead ring 4. Therefore, the bead setter 5 is removed from the bead ring 4 immediately thereafter.

Figure 3D:
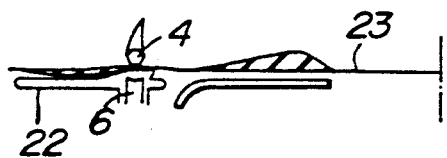
Figure 3E:
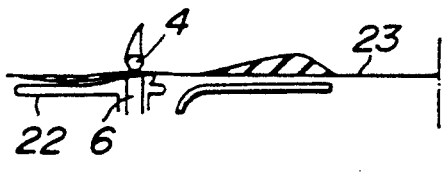
Figure 3F:
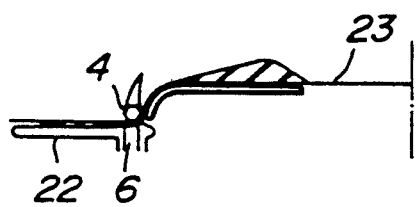
FIGS. 3f, 3g, 3h and 3i are schematic views illustrating further steps followed by the steps of the bead lock method according to the invention, respectively.
Figure 3G:
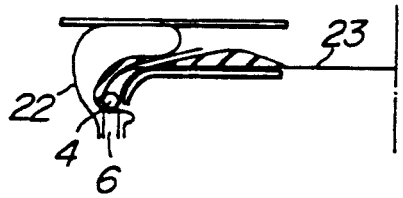
Figure 3H:
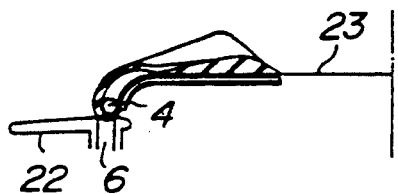
Figure 3I:
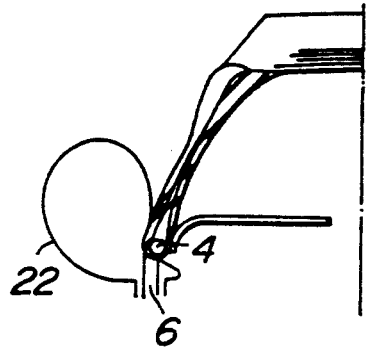

FIG. 3d illustrates the state after removal of the bead setter 5 in a sectional view taken along a plane including one of the first bead lock segments 6 which have been positioned corresponding to the bead setter 5 and whose diameter is now completely reduced.

Thereafter, the driving means 8 is actuated to expand the first bead lock segments 6 simultaneously with the same distances to increase their diameter.

In the expanding the diameter of the first bead lock segments 6, in this case, the pressure of the pressurized air supplied into the fluid chamber 20 for urging the piston 18 of the driving means 9 forwardly is made somewhat lower than that of the pressurized air supplied into the fluid chamber 15. By such a controlling of the pressure in the supplied air, the first bead lock segments 6 are expanded to engage the inner circumferential surface of the bead ring 4, thereby enabling the second bead lock segments 7 which have earlier engaged the inner circumferential surface of the bead ring 4 to be contracted when the second bead lock segments 7 are subjected to forces in radially inward directions.

The radial inward movement of the second bead lock segments 7 to reduce their diameter continues until the pivotally connected points of the links 13 to the piston 12 and of the links 19 to the piston 18 become on the same circle and the driving means 8 and 9 mechanically abut against each other. In the abutment state, forward surfaces of the bead lock segments 6 and 7 are also on the same circle.

The bead ring 4 is held by the first and second bead lock segments 6 and 7 engaging the bead ring 4 and subjected to outwardly directing uniform forces from the these segments 6 and 7 in this manner. Consequently, the bead ring 4 is sufficiently maintained in high concentric or coaxial relation to the tire building apparatus, and its roundness is greatly improved. In this case, the pressure maintaining the bead ring in the preferable condition is determined by the pneumatic pressure in the fluid chamber 20.

After completion of the bead lock, various remaining steps may be carried out in connection with functions of the tire building apparatus. These steps are expanding hard core flanges, turning up one end of the band by the action of the bladder, attaching first members, inflating a green case, and attaching a belt and a tread as shown in FIGS. 3f to 3i.

Although the bead lock apparatus according to the invention has been explained by referring to the embodiment shown in the drawings, the present invention is of course applicable to tire building apparatuses of the other kinds. Moreover, the numbers of the first and second bead lock segments can be changed depending upon forming drum diameters or the like.

As can be seen from the above explanation, according to the invention, it is possible to completely eliminate the expanding processes of the center portion of a band and problems caused thereby. Moreover, according to the invention it is possible to transfer bead rings onto a tire building apparatus with very high accuracy without causing any deformation or eccentricity of the bead rings.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A bead lock method for transferring a bead ring from a bead setter to bead lock segments of a tire forming drum, comprising steps of positioning the bead ring, held by the bead setter by plural pawl members circumferentially spaced from each other by predetermined distance engaging the inner circumferential surface of the bead ring, at a position around the outer circumference of a band on the tire forming drum and coaxial with the axis of the forming drum, rotating the forming drum such that second bead lock segments are positioned between the pawl members forming the bead setter and first bead lock segments are positioned corresponding to the pawl members forming the bead setter, simultaneously expanding with substantially equal distances the second bead lock segments, to bring the second bead lock segments into engagement with the inner circumferential surface of the bead ring with substantially equal forces through the band, removing the bead setter from the bead ring, and then expanding the first bead lock segments simultaneously with substantially equal distances to bring the first bead lock segments into engagement with the inner circumferential surface of the bead ring with substantially equal forces through the band.

2. The bead lock method as set forth in claim 1, wherein the expanding and contracting of the first and second bead lock segments are effected by means of a combination of double acting piston cylinder assemblies, and fluid pressure for expanding the second bead lock segments to maintain the bead ring held is made somewhat lower than that for expanding the first bead lock segments to bring the first bead lock segments into engagement with the inner circumferential surface of the bead ring while enabling the second bead lock segments to be contracted radially inwardly when subjected to forces in radially inward directions.

* * * * *